May 7, 1963 J. C. MILLER 3,089,126

NEGATIVE RESISTANCE DIODE MEMORY

Filed Sept. 8, 1959 3 Sheets-Sheet 1

INVENTOR
JAMES C. MILLER
BY John V. Regan
ATTORNEY

INVENTOR.
JAMES C. MILLER
BY John V. Regan
ATTORNEY

May 7, 1963 J. C. MILLER 3,089,126

NEGATIVE RESISTANCE DIODE MEMORY

Filed Sept. 8, 1959 3 Sheets-Sheet 3

INVENTOR.
JAMES C. MILLER
BY John V. Regan
ATTORNEY

United States Patent Office 3,089,126

Patented May 7, 1963

3,089,126

NEGATIVE RESISTANCE DIODE MEMORY

James C. Miller, Hamilton Square, N.J., assignor to Radio Corporation of America, a corporation of Delaware Filed Sept. 8, 1959, Ser. No. 838,676

6 Claims. (Cl. 340—173)

The present invention relates to improved circuits employing "negative resistance" diodes. While not restricted thereto, the invention is especially useful in high speed memories for computers.

The memory circuit of the present invention includes a negative resistance diode having two regions in its operating range exhibiting positive resistance, and a region between these positive resistance regions exhibiting negative resistance. The two positive resistance regions correspond to two stable states of the diode, one in a lower voltage range and the other in a higher voltage range. One state represents the binary digit zero and the other state the binary digit one. It has been discovered that when the diode is switched from one state to the other by applying direct-current read pulses to the diode, an extremely sharp switching transient occurs. According to the present invention, the switching transient is used to shock excite a resonant circuit connected to the diode. The presence of ringing at the frequency to which the resonant circuit is tuned indicates that a diode has been switched, and its absence that the diode has not been switched. A switched diode is indicative of a stored binary digit of one type, say binary one, and a diode which is not switched is indicative of a binary digit of the other type—binary zero. Extremely good signal-to-noise ratio is obtained since the read or interrogating signal may be a direct current pulse and does not interfere with the radio-frequency signal which is read out.

The invention will be described in greater detail in the following description taken in connection with the accompanying drawing in which:

FIG. 1 is a curve to explain the operation of the circuit of the present invention;

FIG. 1*a* is a simplified diagram of a circuit from which the curve of FIG. 1 may be derived;

Figure 1:
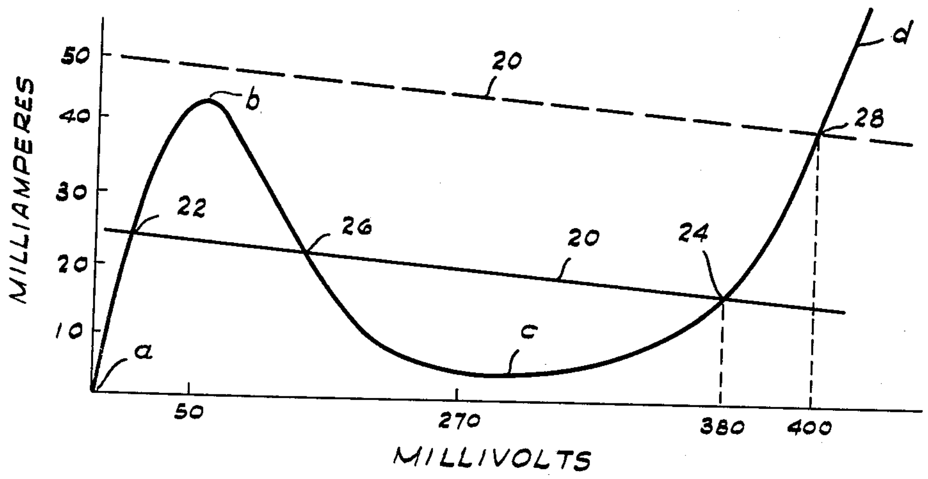

A characteristic which is typical of negative resistance diodes of the voltage controlled type is shown in FIG. 1. The term "voltage controlled" as applied to a negative resistance element implies that two different values of voltage are possible at a given value of applied current. In general, the characteristic of current versus voltage exhibited by such elements is N-shaped when the abscissa is voltage. The values of millivolts and milliamperes given are typical but are not meant to be limiting. The milliampere range, for example, may differ substantially for different diodes.

The portions *ab* and *cd* of the volt-ampere (E-I) characteristic are regions of positive resistance ($dE/dI$, the inverse of slope, which is equal to resistance (R), is a positive quantity). The portion *bc* of the volt-ampere characteristic is a region of negative resistance.

Figure 1A:
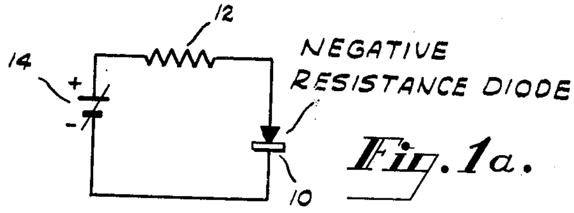

A typical circuit from which the curve of FIG. 1 may be obtained is shown in FIG. 1*a*. It may include, in series, a negative resistance diode 10, a load resistor 12 having a value from ten to several hundred ohms, and a source of voltage 14 having a value of 3 volts or so. The value of resistor 12 may include the internal resistance of source 14. Since the resistance of the diode is of the order of 2 or 3 ohms or less, the source and load resistor together act somewhat like a constant-current source and the load line is as shown at 20. If the source were a perfect constant-current source, load line 20 would be parallel to the millivolt axis.

Load line 20 intersects the positive resistance region *ab* of the characteristic at 22 and the positive resistance region *cd* of the characteristic at 24. It also intersects the negative resistance region *bc* of the diode at 26. The points 22 and 24 are stable operating points and the point 26 is an unstable operating point.

Assume that initially the voltage across the diode is of the order of 25 millivolts or so. The current through the diode is about 23 milliamperes and the diode is at a stable low voltage state represented by the point 22. If the forward-bias current through the diode is increased, for example, by increasing the source voltage, the load line is raised or shifted on the characteristic until the load line passes through point *b*. The point *b* represents a current of about 43 milliamperes. Increasing the forward current to a value greater than this tends to drive the diode through its negative resistance region *bc*. The negative resistance region represents an unstable condition of the diode and, rather than remaining at a voltage within this region, the diode very rapidly switches to its second stable state on the positive resistance portion *cd* of the characteristic. If the current through the diode assumes a value represented by the intersection 28 of the shifted load line 20′ and the positive resistance region *cd*, the voltage across the diode assumes a value represented by the point 28 on the characteristic or roughly 400 millivolts. If the current through the diode returns to the value indicated by load line 20, the voltage reduces to a lower value as indicated by point 24. The point 24 of some other point of stable intersection of the load line with the positive slope region *cd* of the characteristic is hereafter termed the high voltage state of the diode and the point 22 or some other point of stable intersection of the load line with the positive portion *ab* of the characteristic is hereafter termed the low voltage state of the diode.

In a practical circuit, the diode may be switched from one stable state to another by very short current pulses —as short as 0.1–2 millimicroseconds in duration. A forward-bias current pulse can switch the diode from its low to its high state and a reverse-bias current pulse can switch the diode from its high to its low state.

A discussion of some of the above and other aspects of negative resistance diodes may be found in an article titled "Tunnel Diodes as High Frequency Devices" by H. S. Sommers, Jr. appearing in the Proceedings of the IRE, July 1959, page 1201.

Figure 2:
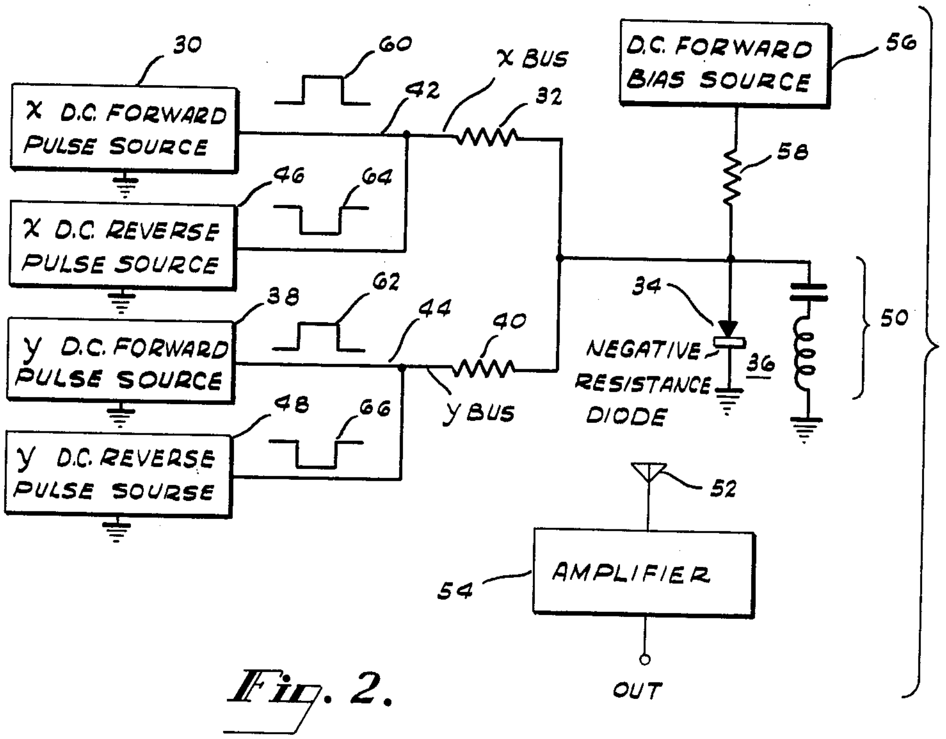
FIG. 2 is a block and schematic circuit diagram of one form of the present invention.

FIG. 2 illustrates one form of the present invention. Direct-current pulse sources 30 and 46 are connected through resistor 32 to the anode 34 of a negative resistance diode 36. Direct-current pulse sources 38 and 48 are connected through resistor 40 also to anode 34. The sources have sufficiently high internal impedances effectively to be isolated from one another. Sources 30 and 38 both supply forward-bias pulses 60 and 62 and sources 46 and 48 both supply reverse-bias pulses 64 and 66. The former are of sufficient amplitude, taken together, to drive the diode to its high voltage state, and the latter to drive the diode from its high to its low voltage state. Lead 42 is designaed an *x* bus and lead 44 is designated a *y* bus.

Anode 34 is connected to a resonant circuit 50 which may be parallel tuned or series tuned. A series tuned circuit is shown in FIG. 2. Oscillations in the resonant circuit, when present, may be detected by an antenna 52 connected to an amplifier 54. Alternatively, a direct connection (not shown) to the tuned circuit though a suitable isolating impedance may be employed. Quiescent bias current for the diode 36 is applied from a direct-current source 56 through a resistor 58 to anode 34.

The circuit of FIG. 2 operates as follows. The direct-current source 56 forward-biases the diode as indicated by load line 20 of FIG. 1. When it is desired to write the binary digit one, sources 30 and 38 simultaneously apply forward-bias direct-current pulses 60 and 62 to the diode. Their amplitudes are such that one pulse is insufficient to "drive" load line 20 past point *b* on the curve but two pulses received coincidentally are sufficient to do so. When it is desired to write the binary digit zero, sources 46 and 48 simultaneously apply reverse-bias pulses 64 and 66. Again, one pulse is of insufficient amplitudes to switch the diode from its high to its low state but two pulses do switch the diode.

Figure 3:
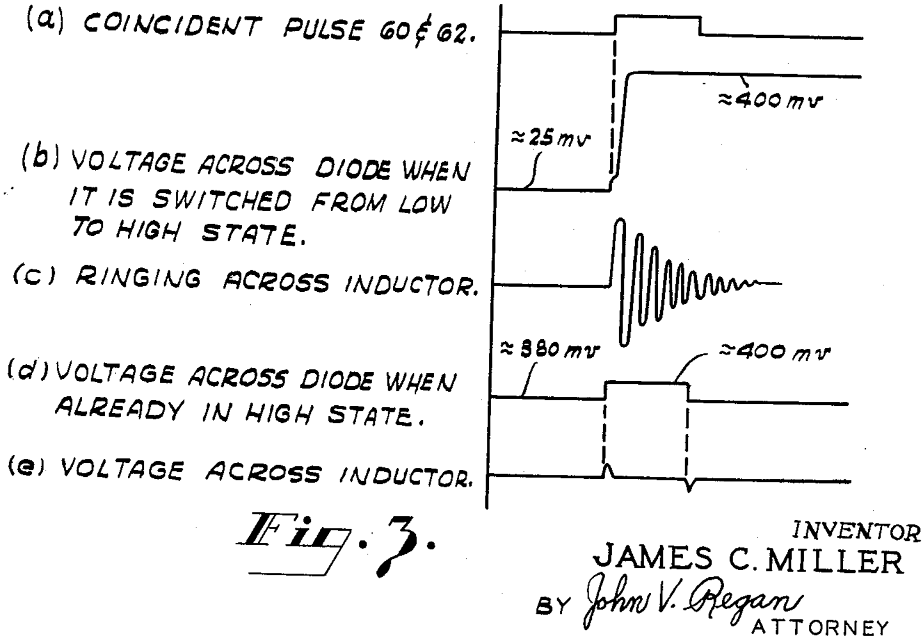
FIG. 3 is a curve of waveforms to aid in explaining the operation of the circuit of FIG. 2.

Read-out may be accomplished by direct-current pulse sources 30 and 38 and associated elements. They cause an output to be present when the diode stores the binary digit zero and not to be present when the diode stores the binary digit one. The waveforms present in this circuit under various conditions are illustrated schematically in FIG. 3 which should be referred to in the discussion which follows.

Assume first that the diode is in its low voltage state, that is, that it represents the digit zero. The two coincident forward-current pulses 60 and 62 (FIG. 2), shown schematically as a single pulse in FIG. 3*a*, switch the diode to its high voltage state. The voltage waveform across the diode is shown in FIG. 3*b*. It can be seen from the latter waveform that the transition from the low to the high voltage state is extremely rapid. The accompanying sharp transient shock excites resonant circuit 50 and the latter rings at the frequency to which it is tuned. Accordingly, the presence of a ringing signal indicates that the diode was storing the binary digit zero.

Assume now that the diode is initially storing the digit one, that is, it is in its high voltage state 24 (FIG. 1). Two coincident forward-current pulses 60 and 62 (FIGS. 2 and 3*a*) cause the diode load line 20 (FIG. 1) to ride up on the region *cd* of the curve. The voltage across the diode is as indicated in FIG. 3*d*, that is, it changes from about 380 millivolts to about 400 millivolts and then drops back to about 380 millivolts. The voltage observed across the inductor of the tuned circuit is as shown in FIG. 3*e*. It consists of a positive-going pulse coincident with the leading edge of the coincident pulses 60 and 62 and a negative-going pulse coincident with the lagging edge of the coincident pulses. This is due to the differentiating action of the lumped and distributed reactances in the circuit. These pulses are of relatively low amplitude compared to the transient which occurs across the diode when it is switched. These pulses are of insufficient amplitude to shock excite the resonant circuit and cause ringing.

In the circuit just described, forward-bias pulses are used to read. These produce ringing when a diode stores the binary digit zero. It will be appreciated that reverse bias D.C. pulses could be used instead. These produce a ringing signal when they switch the diode from its high voltage state to its low voltage state but no ringing signal if the diode is initially in its low voltage state. Thus, a ringing signal produced by reverse-bias D.C. pulses would indicate that a diode stored the digit one and the absence of a ringing signal that it stored the digit zero.

Figure 4:
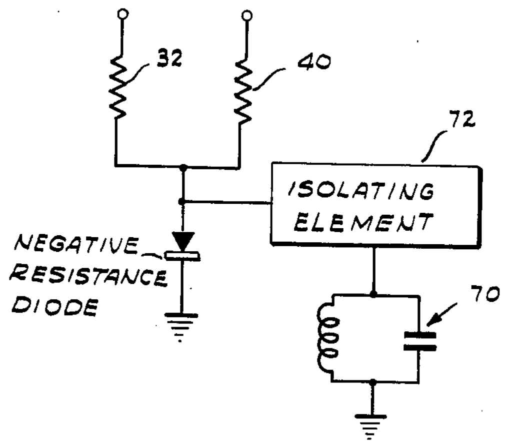
FIGS. 4 and 5 are schematic circuit diagrams of modified portions of the circuit of FIG. 2.

A portion of the circuit of FIG. 2 in modified form is shown in FIG. 4. The difference is in the tuned circuit. A parallel resonant circuit 70 is employed instead of the series resonant circuit 50 of FIG. 2. Isolating element 72, which may be a diode, resistor, capacitor or the like, connects the tuned circuit to the diode. Its purpose is to decouple the diode 36 from the resonant circuit and to prevent or lessen the flow of direct-current through the inductor.

Figure 5:
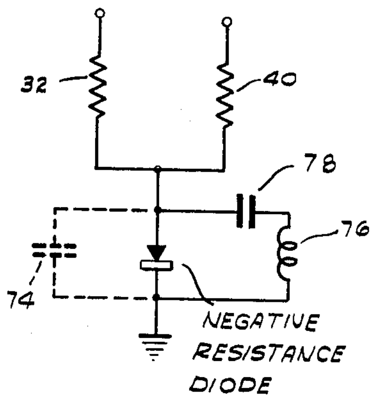

In the modification of FIG. 5, the distributed capacitance of the diode is used as the capacitive element of the resonant circuit. It is shown by dashed lines 74. The inductive portion of the tuned circuit is illustrated at 76. Capacitor 78 is of relatively large value compared to the distributed capacitance 74 and serves as the isolating element.

A practical circuit according to FIG. 2 may have the following circuit values.

Resistors 32 and 40—47 ohms each
Resistor 58—470 ohms
Tuned circuit 50—Capacitor 0.1 microfarad, the inductor 74 microhenries
Ringing frequency—184 kilocycles A practical circuit according to FIG. 4 may have the following circuit values:

Resistors 32, 40 and the D.C. bias resistor 58 (if used)—the same values as above
Isolating element 72—Type T–6 diodes poled to prevent direct-current flow through the tuned circuit
Tuned circuit 70—the oscillating frequency of the circuit was 35 megacycles. The precise values of inductance and capacitance actually used were not noted but they may be chosen according to the formula $$f=\frac{1}{2\pi\sqrt{LC}}$$

where *f* is the oscillating frequency and LC is the value of inductance and capacitance respectively.

For both examples above, the values of voltages employed depend on the value of direct-current bias and the particular negative resistance diode employed. Typically, the D.C. pulses may be of the order of a fraction of a volt to several volts.

Figure 6:
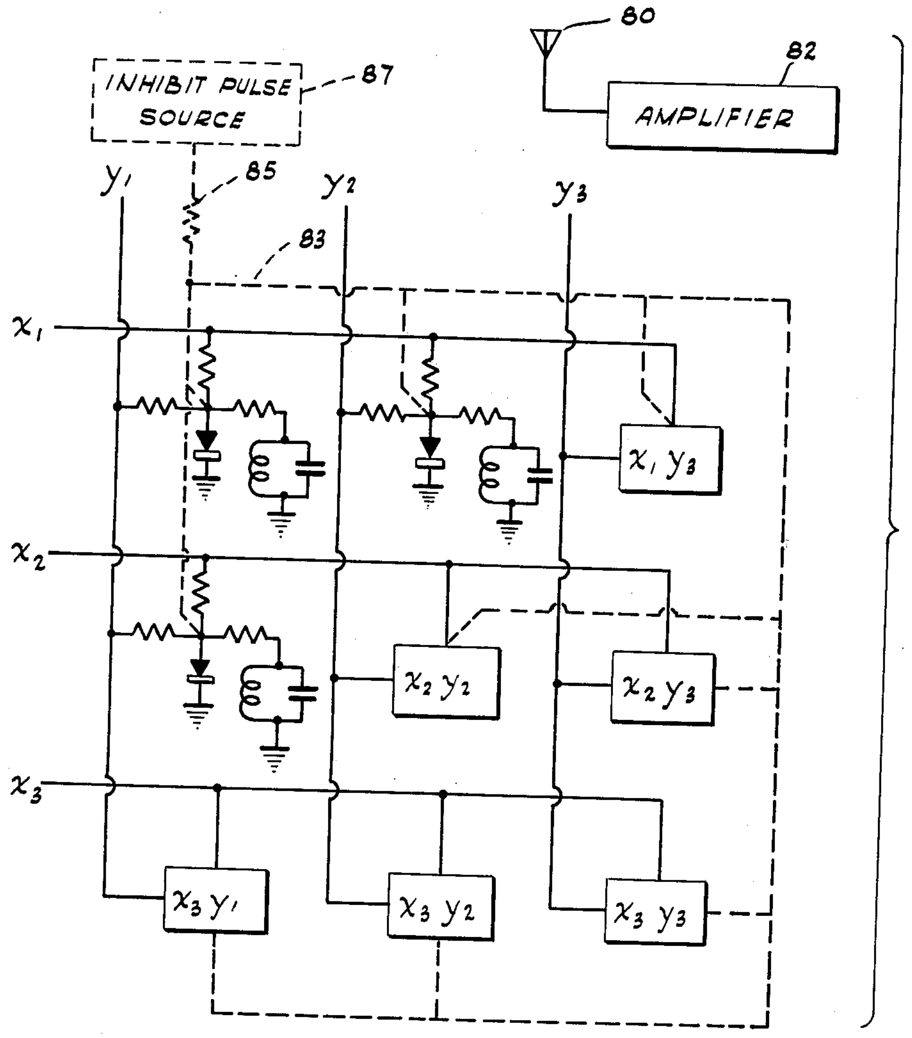
FIG. 6 is a block and schematic circuit diagram of a memory matrix according to the present invention.

A memory matrix or memory plane is illustrated in FIG. 6. Only three *x* buses and three *y* buses are shown. It is to be understood that there may be many more of each and there may be many more than nine memory elements. Also, there may be a relatively large number of memory matrixes. The *x* read and write sources (not shown) may be of the type illustrated in FIG. 2. A selected *x* bus, say $x_1$, may correspond to bus 42 of FIG. 2 and a selected *y* bus, $y_1$, may correspond to bus 44 of FIG. 2, and similar circuits may be provided for other lines. Ordinarily, only one pair of read and one pair of write sources are required for each memory plane. These are connected through switches (not shown) to the buses. A single antenna which is common to all diodes in a memory plane is shown at 80. It is connected to a common amplifier 82. Alternatively a sense line (not shown) common to all diodes may be used as a direct connection from the diodes to the amplifier. Read-out from the memory plane may be during the coincident read pulses or after their termination. In either case, the read-out interval may correspond to appropriate gates supplied to the amplifier.

The ringing produced in the tuned circuit when a diode switches will last for a time which depends upon the losses inherent in the circuit. The higher the circuit Q, the longer the ringing. The number of cycles used for read-out in a practical circuit will depend upon the speed of the computer desired. Ordinarily 10 or so cycles may be used but this is not meant to be a limiting figure and a number of cycles either greater or less may be employed. The duration of the read-out pulses may be of the order of a fraction of a millimicrosecond to several millimicroseconds.

Although the memory plane illustrated is shown formed of conventional elements, in practice they are preferably printed circuits. The resonant circuits, for example, may be sections of transmission lines such as strip transmission lines, cavity resonators, or other similar distributed reactive elements.

In the embodiments of the present invention discussed, the binary digit one is written into a diode by simultaneously applying two forward-biases, direct-current pulses and the binary digit zero is written into the diode by simultaneously applying two reverse-bias, direct-current pulses. There is another writing arrangement which may be employed. This other arrangement employs a $z$ axis, that is, an additional bus (shown by dashed lines 83 in FIG. 6) connected to each diode-anode. This $z$ bus is connected through an isolating resistor 85 to a reverse-bias, direct-current, inhibit pulse source 87. In many memories, normally each memory cycle has a read operation followed by a write operation. During the read operation, for example, reverse-bias pulses are applied to the $x$ and $y$ buses of a selected diode to charge the diode to the low voltage state. Thus, after each read operation, the selected diode is always in the low voltage state representing a binary zero. During the following write portion of the memory cycle, either a binary zero or binary one may be written into the selected diode. To write a binary zero into the selected diode, forward-bias pulses are applied concurrently to the one $x$ and the one $y$ bus connected to the selected diode. The selected diode into which it is desired to write the binary digit zero will, in addition, have a reverse-bias pulse applied from the inhibit direct-current source. The sum of the two forward-bias pulses and the inhibit reverse-bias pulse is a net forward-bias pulse of insufficient amplitude to change the selected diode from the low voltage state (binary zero). To write a binary one digit, the inhibit pulse is not applied to the $z$ bus. The pair of $x$ and $y$ pulses then produce sufficient forward-bias to change the selected diode from the initial low voltage state to the high voltage state, representing the binary one digit.

Ringing occurs in the circuit of the present invention whenever the diode switches from one state to another. Thus, it can occur during the write portion of the cycle as well as the read portion of the cycle. This, however, causes no difficulty, as any ringing during the write portion of the cycle can be ignored. Amplifier 54, for example, can be gated on only during or shortly after the read interval. Alternatively, the logic circuits after the amplifier may be maintained inactive except during the read operations.

Some advantages of the present invention are:

(1) Only a single diode is required for each bit of information.

(2) The circuit has high signal-to-noise ratio.

(3) A single $x$—$y$ matrix serves for both read and write.

(4) The memory is simple, light in weight and adaptable for miniaturization.

What is claimed is:

1. A memory circuit comprising, in combination, a negative resistance diode having two stable operating states; means for simultaneously applying two read pulses of the same polarity to said diode of sufficient amplitude to switch the diode from one of its stable states to another of its stable states, whereby if said diode is in said one state initially, it is switched to said other state and a transient occurs across that diode, whereas if said diode is in said other state initially, it is not switched; and a resonant circuit connected to said diode and responsive to said transient for producing a damped ringing oscillation at the frequency to which it is tuned.

2. A memory system comprising, in combination, a plurality of negative resistance diodes of the voltage controlled type; a plurality of $x$ leads; a like plurality of $y$ leads, each diode being connected to one $x$ lead and one $y$ lead, and all diodes being connected to different pairs of said leads; a circuit for reading information stored in the diodes out of the diodes including means for applying a direct-current pulse to one of the $x$ leads and a concurrent direct-current pulse to one of the $y$ leads, said two pulses together having an amplitude sufficient to switch the diode connected to said one $x$ and said one $y$ lead from one of its stable states to another, whereby if said diode is in said one state initially, it is switched and if it is not, it is not switched; a resonant circuit connected to each diode and responsive to the transient across its diode when its diode is switched for producing a ringing oscillation; and a circuit including an antenna which is common to all of said diodes for receiving energy at the ringing oscillation frequency.

3. A memory system as recited in claim 2, including a $z$ bus connected to all said diodes, and means for selectively applying an inhibit pulse to said $z$ bus.

4. A memory system comprising, in combination, a plurality of tunnel diodes; a plurality of $x$ leads; a like plurality of $y$ leads, each diode being connected to one $x$ lead and one $y$ lead, and all diodes being connected to different pairs of said leads; a circuit for reading information stored in the diodes out of the diodes including means for applying a direct-current pulse to one of the $x$ leads and a concurrent direct-current pulse to one of the $y$ leads, said two pulses together having an amplitude sufficient to switch the diode connected to said one $x$ and said one $y$ lead from one of its stable states to another, whereby if said diode is in said one state initially, it is switched and if is it not, it is not switched; a resonant circuit connected to each diode and responsive to the transient across its diode when its diode is switched for producing a ringing oscillation; and a circuit including an antenna which is common to all of said diodes for receiving energy at the ringing oscillation frequency.

5. A memory element comprising, in combination, a tunnel diode; means for switching the diode from one stable state to the other, whereby a voltage transient occurs across said diode; a resonant circuit connected to said diode which is shock excited and produces a damped ringing oscillation in response to said transient; and a pickup means in the radiation field of said resonant circuit for receiving signals at the ringing frequency of said resonant circuit.

6. A memory circuit comprising, in combination, a tunnel diode; means for simultaneously applying two read pulses of the same polarity to said diode of sufficient amplitude to switch the diode from one of its stable states to another of its stable states, whereby if said diode is in said one state initially, it is switched to said other state and a transient occurs across that diode, whereas if said diode is in said other state initially, it is not switched; and a resonant circuit connected to said diode and responsive to said transient for producing a damped ringing oscillation at the frequency to which it is tuned.

References Cited in the file of this patent

UNITED STATES PATENTS

| | | |
|---|---|---|
| 2,235,667 | Blount et al. | Mar. 18, 1941 |
| 2,713,639 | Blackman | July 19, 1955 |
| 2,907,000 | Lawrence | Sept. 29, 1959 |
| 2,975,377 | Price et al. | Mar. 14, 1961 |
| 2,986,724 | Jaeger | May 30, 1961 |

FOREIGN PATENTS

| | | |
|---|---|---|
| 166,800 | Australia | Feb. 6, 1956 |

OTHER REFERENCES

Magazine article, "Negative Resistance in Germanium Diodes," Radio-Electronic Engineering, April 1953, pp. 8–10.